(12) United States Patent
Sakuragi et al.

(10) Patent No.: US 11,643,056 B2
(45) Date of Patent: May 9, 2023

(54) DRIVING ASSISTANCE APPARATUS

(71) Applicant: Mazda Motor Corporation, Hiroshima (JP)

(72) Inventors: Yutaka Sakuragi, Hiroshima (JP); Masaaki Aoki, Hiroshima (JP); Keiichi Yamasaki, Hiroshima (JP); Katsuhisa Maedo, Hiroshima (JP); Shigeru Takenaka, Hiroshima (JP); Kenichi Nakamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/546,067

(22) Filed: Dec. 9, 2021

(65) Prior Publication Data
US 2022/0219655 A1 Jul. 14, 2022

(30) Foreign Application Priority Data

Jan. 13, 2021 (JP) .............................. JP2021-003546

(51) Int. Cl.
*B60T 7/10* (2006.01)
*B60K 23/00* (2006.01)
(Continued)

(52) U.S. Cl.
CPC .............. *B60T 7/105* (2013.01); *B60K 23/00* (2013.01); *B60Q 1/0076* (2013.01); *B60T 7/085* (2013.01)

(58) Field of Classification Search
CPC ........... B60K 23/00; B60K 37/06; B60T 7/10; B60T 7/08; B60T 7/102; B60T 7/085; G05G 1/01; G05G 1/02; G05G 1/04
(Continued)

(56) References Cited

U.S. PATENT DOCUMENTS

| 7,870,923 B2 * | 1/2011 | Miyabe | .................... B60T 7/042 180/219 |
| 7,900,733 B2 * | 3/2011 | Miyabe | ................. B60W 50/10 180/172 |

(Continued)

FOREIGN PATENT DOCUMENTS

| CN | 102741116 B * | 8/2014 | ............. B60K 35/00 |
| DE | 102021208310 A1 * | 5/2022 | ............. B60K 35/00 |

(Continued)

OTHER PUBLICATIONS

Extended European search report dated Jun. 20, 2022, in corresponding European patent Application No. 22150630.6, 6 pages.

*Primary Examiner* — Paul N Dickson
*Assistant Examiner* — Caitlin Anne Miller
(74) *Attorney, Agent, or Firm* — Xsensus LLP

(57) ABSTRACT

A driving assistance apparatus that includes a brake operation portion that applies a brake to a vehicle, the brake operation portion allowing a manual brake operation by a hand of a driver of the vehicle, the brake operation portion including a brake operation body and a grip portion to be gripped by the hand of the driver, the grip portion being provided at an upper end of the brake operation body, and a shift-down switch that shifts-down the vehicle is provided on the grip portion, the shift-down switch allowing a manual shift-down operation by the hand of the driver.

14 Claims, 8 Drawing Sheets

(51) Int. Cl.
*B60Q 1/00* (2006.01)
*B60T 7/08* (2006.01)

(58) Field of Classification Search
USPC .................................................. 180/333, 167
See application file for complete search history.

(56) References Cited

U.S. PATENT DOCUMENTS

| | | | |
|---|---|---|---|
| 8,900,078 B2* | 12/2014 | Yamaguchi | B62M 9/122 |
| | | | 474/82 |
| 2010/0056331 A1 | 3/2010 | Johansson et al. | |
| 2013/0090195 A1 | 4/2013 | Yamaguchi et al. | |
| 2017/0267255 A1* | 9/2017 | Numazawa | B60W 10/18 |
| 2020/0180713 A1* | 6/2020 | Kosaki | E02F 9/2004 |
| 2020/0290699 A1* | 9/2020 | Haraguchi | B62K 23/04 |
| 2022/0219654 A1* | 7/2022 | Oyama | G05G 1/025 |

FOREIGN PATENT DOCUMENTS

| | | | | |
|---|---|---|---|---|
| GB | 2442974 A | 4/2008 | | |
| JP | 2002-120590 A | 4/2002 | | |
| WO | WO-2019102588 A1 * | 5/2019 | ............... | G05G 1/01 |
| WO | 2020/256025 A1 | 12/2020 | | |

* cited by examiner

DRIVING ASSISTANCE APPARATUS

CROSS-REFERENCE TO RELATED APPLICATION

The present application claims priority to JP2021-003546, filed Jan. 13, 2021, the entire disclosure of which is incorporated herein by reference.

TECHNICAL FIELD

The present disclosure relates to a driving assistance apparatus for physically handicapped people, and relates to a driving assistance apparatus that allows a person with a lower limb disability seated on a driver seat to manually perform a brake operation using a brake operation portion included in a vehicle cabin.

BACKGROUND ART

A vehicle including an operation lever that allows a manual brake operation has been conventionally known (for example, see Patent Literature 1).

The vehicle in Patent Literature 1 is useful because even a driver with a lower limb disability can perform a steering operation with one hand and, at the same time, perform a brake operation with the other hand using the operation lever.

On the other hand, in driving a vehicle such as an automobile, heavy use of a normal brake operation may cause vapor lock, fade, and the like; accordingly, in traveling on a downhill such as a mountain road that requires a frequent brake operation, it is preferable to decelerate using an engine brake in addition to a normal brake.

The driver may utilize the engine brake by operating a paddle shift switch provided on a steering wheel, but while operating the steering wheel with the one hand, further performing a shift change operation with the same one hand using the paddle shift switch is poor in operability, and there is a concern that the engine brake may not be activated appropriately.

In order to solve the above problem, the inventors of the present disclosure have conducted earnest studies for a structure that allows even a physically disabled driver to freely perform a driving operation and easily operate a normal brake and an engine brake.

CITATION LIST

Patent Literature

[Patent Literature 1] Japanese Patent Laid-Open No. 2018-39452

SUMMARY

The present application provides a driving assistance apparatus, comprising: a brake operation portion configured to apply a brake to a vehicle, the brake operation portion allowing a manual brake operation by a hand of a driver of the vehicle, wherein the brake operation portion includes a brake operation body and a grip portion configured to be gripped by the hand of the driver, the grip portion being provided at an upper end of the brake operation body, and a shift-down switch configured to shift-down the vehicle is provided on the grip portion, the shift-down switch allowing a manual shift-down operation by the hand of the driver.

DETAILED DESCRIPTION

Figure 1:
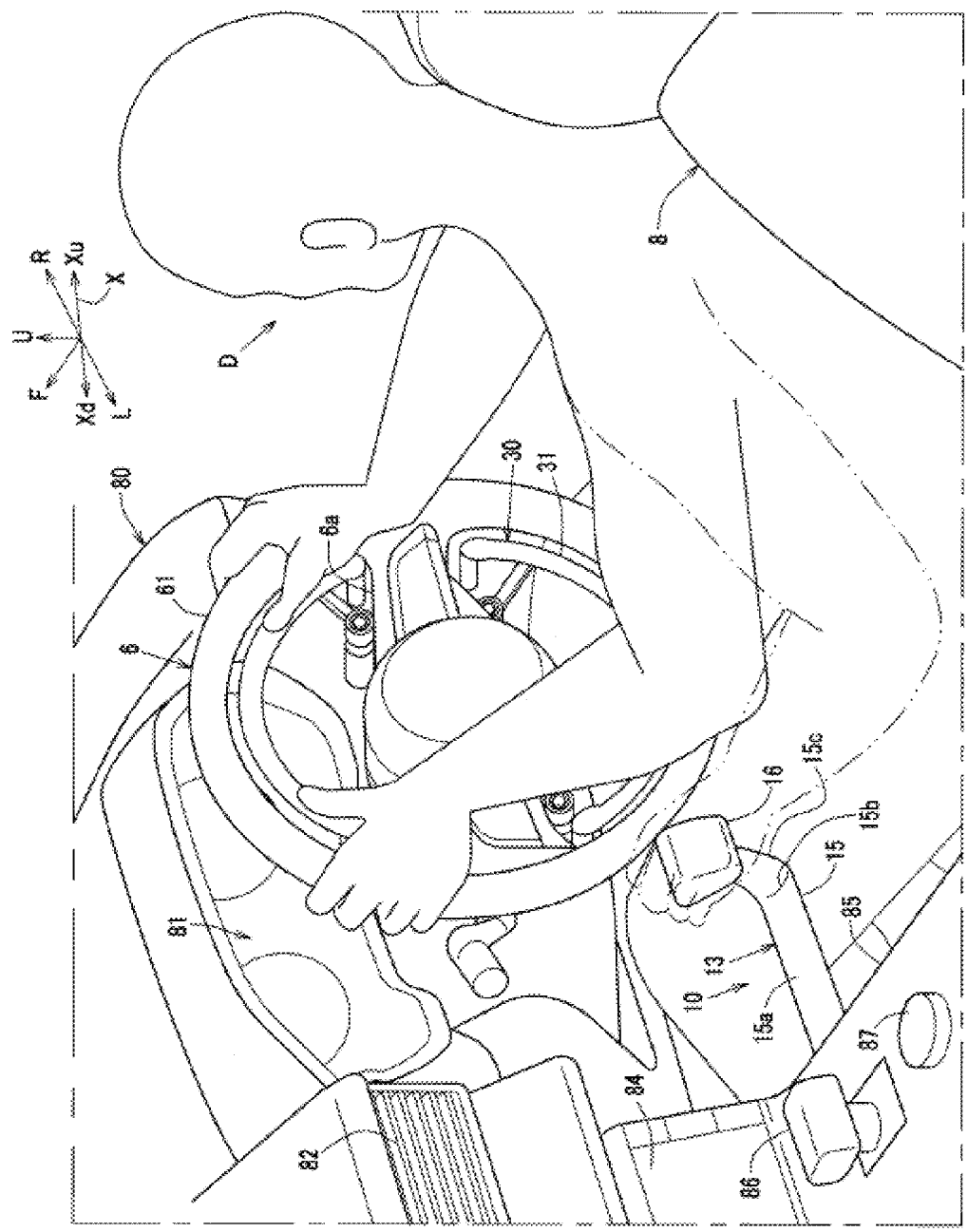
FIG. 1 is an external view illustrating a situation of driving a vehicle including a brake manual operation apparatus of the present embodiment.

Problem to be Solved by the Disclosure

The present disclosure has been made in view of such a problem, and an object of the present disclosure is to provide a driving assistance apparatus that allows even a physically disabled driver to freely perform a driving operation and easily manually operate a normal brake and an engine brake.

Means for Solving the Problems

The present disclosure is a driving assistance apparatus including, in a vehicle cabin, a brake operation portion that allows a manual brake operation, and the driving assistance apparatus is characterized in that the brake operation portion is disposed in the vicinity of a steering wheel and includes a brake operation body and a grip portion provided at an upper end of the brake operation body, and a shift-down switch that allows a manual shift-down operation is provided on the grip portion.

According to the configuration, even in the case of driving while performing a steering operation with one hand and performing a brake operation with the other hand, it is possible to perform the shift-down operation while performing the brake operation with the other hand, and thus it is possible to safely decelerate while applying an engine brake.

Accordingly, even a physically disabled driver can freely perform a driving operation and easily operate a normal brake and the engine brake.

As an aspect of the present disclosure, it is characterized in that the shift-down switch is disposed at, in a back face on the non-driver side of the grip portion, a position at which a driver can operate the shift-down switch with a fingertip in a state of gripping the grip portion.

According to the configuration, while a brake operation lever is operated with the grip portion gripped, for example, an index finger and middle finger of a hand gripping the grip portion go around the back face on the non-driver side of the grip portion from a front face on the driver side of the grip portion, so that it is possible to easily operate the shift-down switch with fingertips of the index finger and the middle finger.

As an aspect of the present disclosure, it is characterized in that the steering wheel includes a paddle shift switch that allows a manual shift operation, the paddle shift switch is formed by a shift-up switch that allows a shift-up operation and the shift-down switch, the paddle shift switch is disposed in a positional relationship in which the shift-up switch is on one side with respect to a central axis of the steering wheel and the shift-down switch is on the other side with respect to the central axis, and the shift-up switch and the shift-down switch are provided on the grip portion in a positional relationship similar to the positional relationship of the paddle shift switch in the steering wheel.

According to the configuration, the paddle shift switch provided on the grip portion side has the same layout as the paddle shift switch provided on the steering wheel side, so that the driver can operate the paddle shift switch provided on the grip portion side with the same feeling as in the shift operations (the shift-up operation and the shift-down operation) using the paddle shift switch provided on the steering wheel side.

Advantageous Effects of Disclosure

According to the configuration, even a physically disabled driver can freely perform the driving operation and easily manually operate the normal brake and the engine brake.

MODE FOR CARRYING OUT THE DISCLOSURE

Hereinafter, an embodiment of the present disclosure will be described in detail based on the drawings.

In the figures, arrow F indicates the vehicle front side; arrow U, the vehicle upper side; arrow R, the vehicle right side; arrow L, the vehicle left side; arrow X, the axis direction of a steering wheel; arrow Xu, the upper side of the axis direction of the steering wheel (driver side); arrow Xd, the lower side of the axis direction of the steering wheel (the opposite side of the driver side).

As illustrated in FIGS. 1 to 4, a vehicle of the present embodiment is a right-hand drive vehicle and includes a brake manual operation apparatus 10 that allows a driver with a lower limb disability who has difficulty in a depression operation of a brake pedal or an accelerator pedal with his or her foot to manually perform a brake operation in a state of being seated on a driver seat, and an accelerator manual operation apparatus 30 (see FIGS. 1 to 3) that allows the driver to manually perform an acceleration operation in a state of being seated on the driver seat.

Note that the brake manual operation apparatus 10 of the present embodiment corresponds to a driving assistance apparatus of the present disclosure.

The brake manual operation apparatus 10 and the accelerator manual operation apparatus 30 are incorporated into a base vehicle by modifying the base vehicle. The brake manual operation apparatus 10 and the accelerator manual operation apparatus 30 will be described hereinafter, but prior to that, a description will be given of a schematic structure of the base vehicle.

Figure 2:
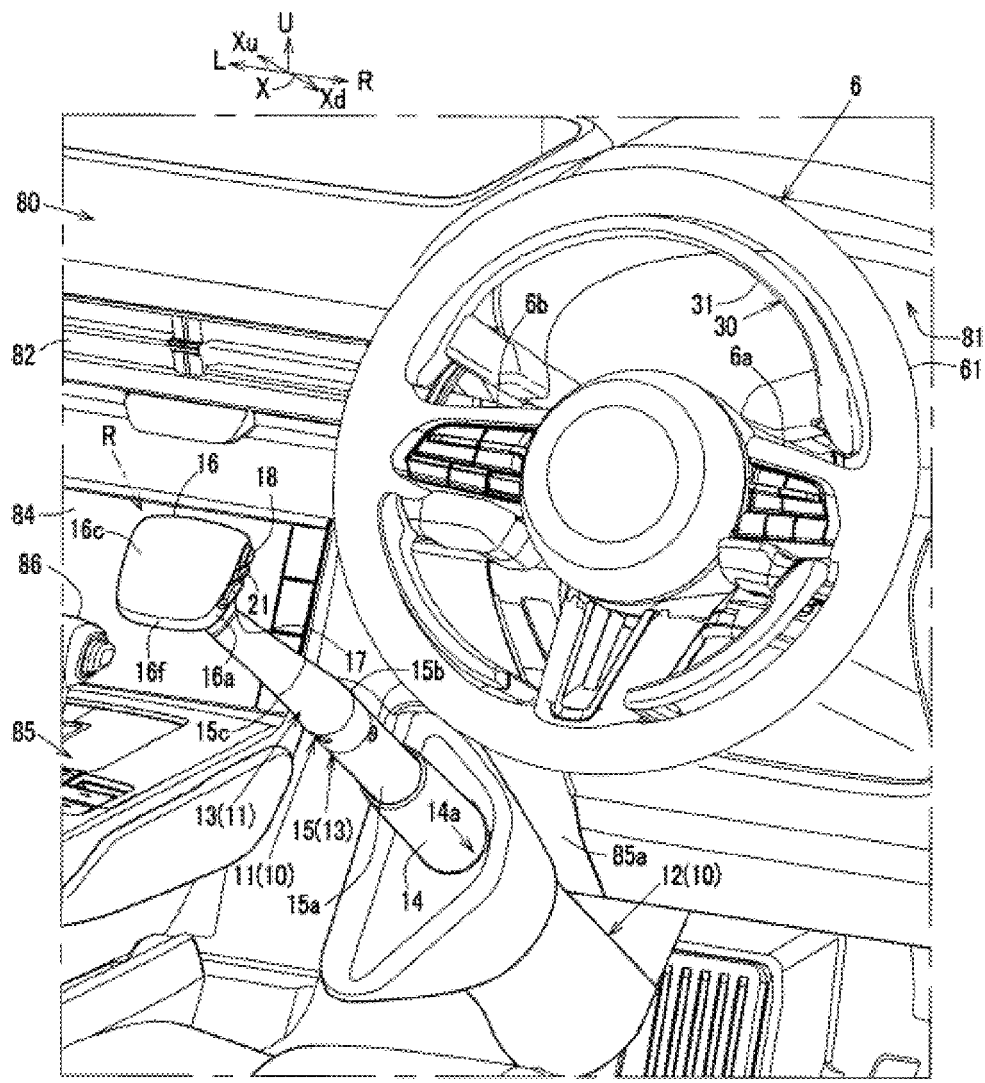
FIG. 2 is an external view of the brake manual operation apparatus of the present embodiment installed in a vehicle cabin as viewed from the driver seat side.
Figure 3:
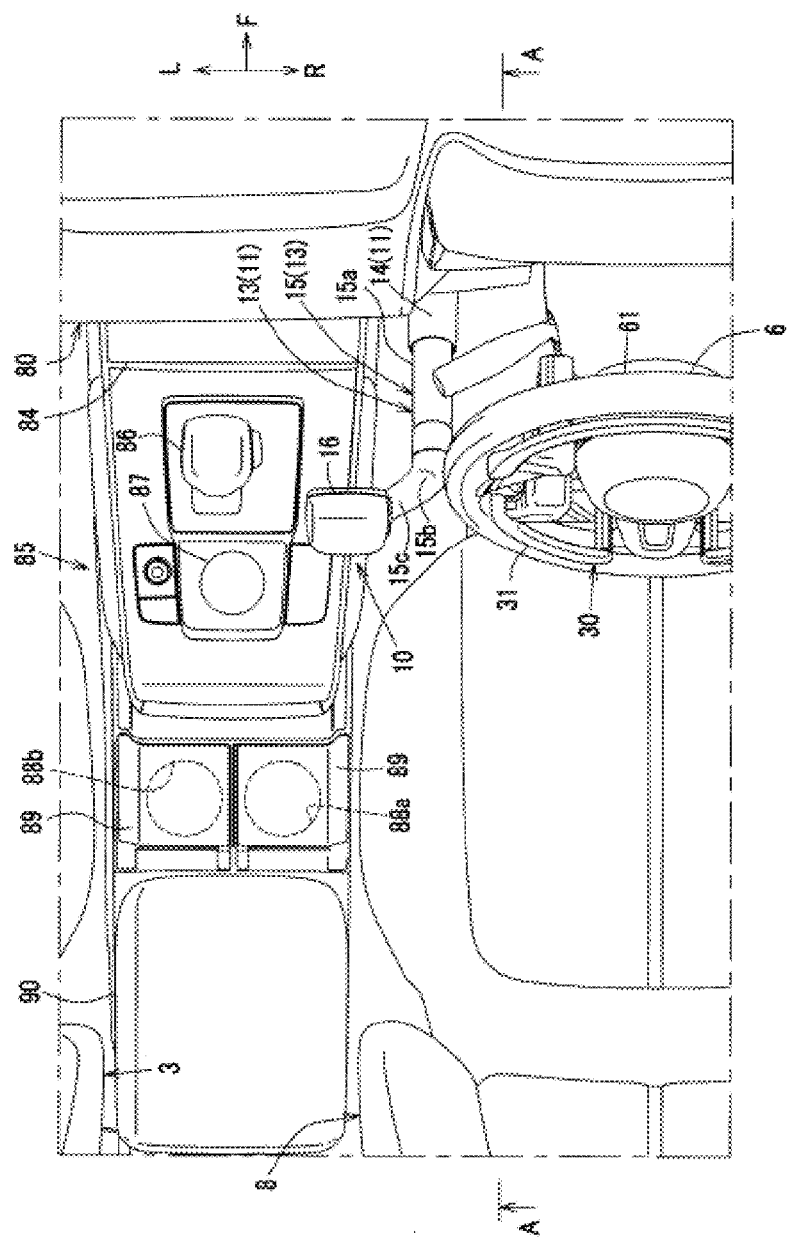
FIG. 3 is a plan view of the inside of the vehicle cabin illustrating the brake manual operation apparatus of the present embodiment and its vicinity.

A driver seat 8 and a passenger seat (illustration omitted) are mounted on the respective right and left sides of a front portion of a floor panel 2 (see FIG. 4) of a vehicle cabin in the vehicle, and as illustrated in FIGS. 1 to 3, a steering wheel 6 that is operated in a state of being gripped by a driver seated on the driver seat 8 is provided in front of the driver seat 8.

Figure 8:
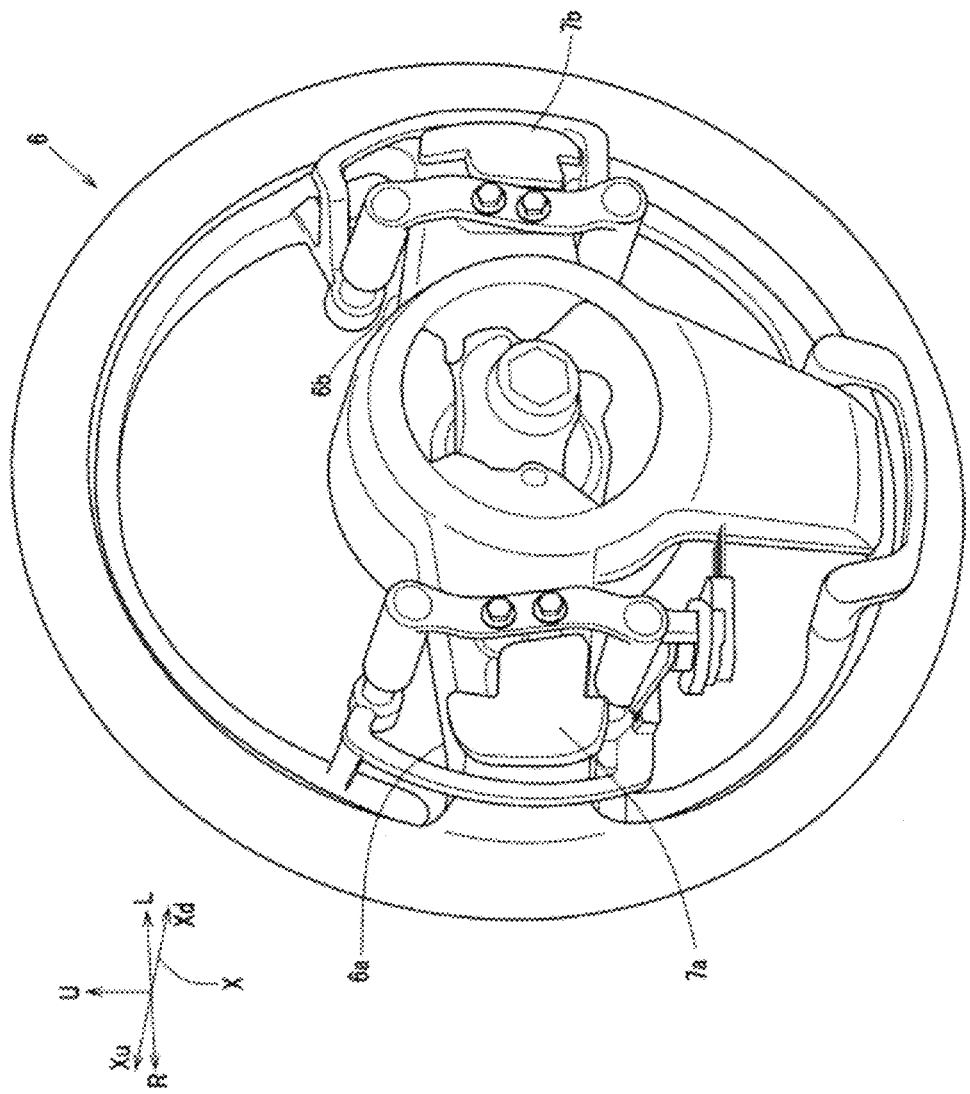
FIG. 8 is a perspective view of a steering wheel including a paddle shift switch as viewed from the non-driver side and the right side.

Furthermore, as illustrated in FIG. 8, the steering wheel 6 includes paddle shift switches 7a and 7b formed by a pair of the shift-up switch 7a for upshift and the shift-down switch 7b for downshift.

In this example, the shift-up switch 7a is included on a rear face of a right-side spoke portion 6a, and the shift-down switch 7b is included on a rear face of a left-side spoke portion 6b.

As illustrated in FIGS. 1 to 4, an instrument panel 80 is provided in a front end of the vehicle cabin over the whole vehicle width direction of the vehicle cabin. A center console 85 extending in the front-rear direction is provided between the driver seat 8 and the passenger seat in the front portion of the floor panel 2 of the vehicle cabin. The instrument panel 80 and the center console 85 both form a part of an interior member of the vehicle cabin, and a front portion of the center console 85 is integrally connected to a vehicle-width-direction center portion of the instrument panel 80.

As illustrated in FIG. 3, on an upper face of the center console 85 extending in the front-rear direction, various operation portions such as a shift knob 86 for a gear-shifting operation and a start switch 87, drink holders 88a and 88b, and an armrest 90 are provided in this order from the front side to the rear side.

Note that each of the drink holders 88a and 88b is formed in a recess shape such that a drink container can be placed thereon, and includes a lid 89 that opens and closes an opening thereof. In this example, the drink holder 88b for an occupant seated on a passenger seat 3 and the drink holder 88a for the driver are disposed in parallel on the respective left and right sides in an intermediate region between the various operation portions and the armrest 90 in the front-rear direction on the upper face of the center console 85.

The intermediate region on the upper face of the center console 85 is not limited to being formed in a recess shape as the drink holders 88a and 88b as in the present embodiment and, for example, may be formed in a recess shape as a box portion that houses small items.

As illustrated in FIGS. 1 and 2, a display portion 81 of various measurement instruments such as a tachometer and a speed meter is disposed in front of the driver seat 8 in the instrument panel 80 so as to be visible through the steering wheel 6, an air conditioning outlet 82 is disposed above a connection portion of the left side of the display portion 81 and the front portion of the center console 85, and a display 84 of a navigation device is provided below the air conditioning outlet 82.

Note that an accelerator pedal (illustration omitted) is provided at a position at which a right foot of the driver seated on the driver seat 8 is placed, on the floor panel 2 in front of the driver seat 8 in the vehicle cabin, and a brake pedal (illustration omitted) is provided near the left side from the accelerator pedal (vehicle-width-direction center side).

The accelerator pedal is an organ-type pedal that operates a throttle valve of an engine, and the brake pedal is a suspended-type pedal that operates a brake, both of which are typical pedals included in the base vehicle.

Hereinafter, the brake manual operation apparatus 10 will be described.

As illustrated in FIGS. 1 to 3, the brake manual operation apparatus 10 is installed on the left side with respect to the steering wheel 6 in the vicinity of the front side of the driver seat 8, that is, in the vicinity of a right wall 85*a* (see FIG. 2) of a connection portion of the center console 85 and the instrument panel 80.

As illustrated in FIG. 2, an upper portion of the brake manual operation apparatus 10 includes a brake operation unit 11, and a lower portion of the brake manual operation apparatus 10 includes an operation amount transmission unit 12. Furthermore, the brake operation unit 11 includes an operation bar 13 and an axially supporting portion 14.

Figure 4:
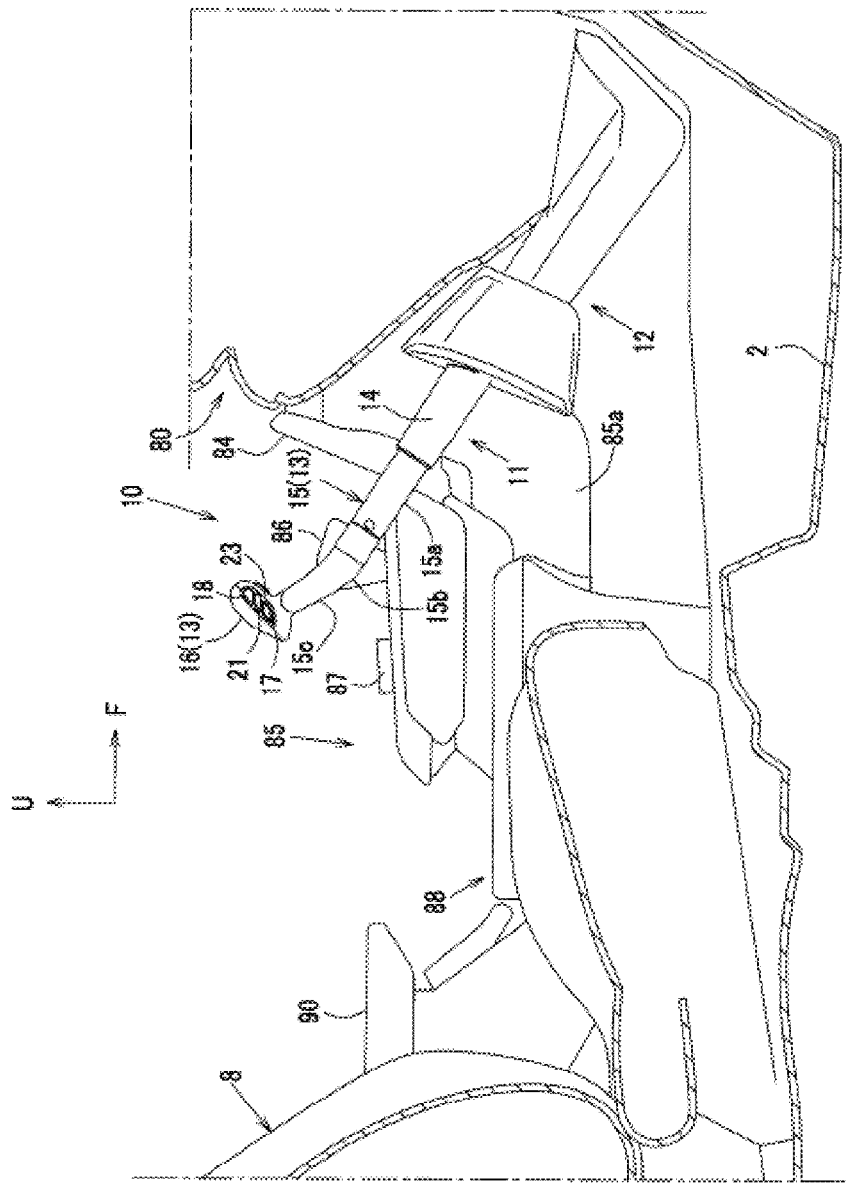
FIG. 4 is a cross-sectional view of a main portion taken along line A-A of FIG. 3.

The operation bar 13 is made of a metal pipe material (a so-called round pipe) having a circular orthogonal cross-section in the axis direction and is disposed in a posture inclined in a front-low rear-high shape. Specifically, an upper portion of the operation bar 13 is located at a height at which the driver seated on the driver seat 8 can operate the operation bar 13 with his or her left hand, at a position in the vicinity of the left side with respect to the steering wheel 6 (a position corresponding to a boundary portion between the center console 85 and the floor panel in a plan view) (see FIG. 3). Furthermore, as illustrated in FIG. 4, the operation bar 13 extends in the front-lower direction toward the floor panel 2 in the vicinity of the front side of the driver seat 8.

A lower portion of the operation bar 13 is axially supported by the axially supporting portion 14 such that the operation bar 13 is slidably displaced in the front-lower direction with respect to the axially supporting portion 14 by being subjected to a pushing operation (that is, a brake operation) in the front-lower direction along the axis direction of the operation bar 13.

The operation bar 13 slides in the axis direction between a neutral position and a maximum pushing position at which the operation bar 13 is further pushed from the neutral position by a predetermined length in the front-lower direction. Note that the operation bar 13 illustrated in FIGS. 1 to 7 illustrates a state of being disposed in the neutral position.

The operation amount transmission unit 12 intervenes between the brake operation unit 11 and the brake pedal (illustration omitted) and is configured to transmit to the brake pedal an operation force (operation amount) of the sliding displacement of the operation bar 13 in the front-lower direction. That is, the brake pedal included in the base vehicle is configured to operate in conjunction with sliding movement of the operation bar 13 in the axis direction due to the manual brake operation.

Thus, the brake manual operation apparatus 10 can activate the brake by rotating the brake pedal at a depression amount according to a sliding amount (pushing amount) of the operation bar 13 in the front-lower direction during the manual brake operation using the operation bar 13.

Furthermore, similarly to the brake pedal, the operation bar 13 is biased to the neutral position, and the neutral positions of the operation bar 13 and the brake pedal are associated with each other. Thus, when pushing of the operation bar 13 from the neutral position in the front-lower direction is released by the driver, the operation bar 13 and the brake pedal are simultaneously restored to the respective neutral positions.

Furthermore, as illustrated in FIGS. 1 to 3, the accelerator manual operation apparatus 30 of the present embodiment includes an accelerator lever 31 as an acceleration operation member disposed in the vicinity of the radially inner side with respect to a rim portion 61 of the steering wheel 6.

The accelerator lever 31 is configured to be capable of being pushed downward in the steering axis direction (non-driver side) from a neutral position by the user using, for example, a thumb of his or her hand gripping the steering wheel 6. Furthermore, the accelerator lever 31 is biased to the neutral position so as to be capable of being restored to the neutral position from a position at which the accelerator lever 31 is pushed from the neutral position.

Thus, the driver can perform a pushing operation of the accelerator lever 31 between the neutral position and a maximum pushing position at which the accelerator lever 31 is pushed by a predetermined length, and according to the pushing amount, the driver can perform an opening operation of the throttle valve of the engine, that is, an acceleration and deceleration operation of the vehicle.

Subsequently, the operation bar 13 included in the brake manual operation apparatus 10 of the present embodiment will be described in more detail.

As illustrated in FIGS. 1 to 7, the operation bar 13 is formed by integrating an operation bar body 15 and a grip portion 16 provided at an upper end of the operation bar body 15.

The operation bar body 15 includes a base portion 15*a* and an inclined portion 15*c* inclined upward with respect to the base portion 15*a*, and the base portion 15*a* and the inclined portion 15*c* are integrally formed via a bent portion 15*b*.

As illustrated in FIGS. 1 to 4, the base portion 15*a* extends in a direction coinciding with the front-rear direction in a vehicle plan view, linearly extends in a posture inclined in a front-low rear-high shape coaxially with the axially supporting portion 14, and is formed with the substantially same diameter along the axis direction. As illustrated in FIG. 2, a lower portion of the base portion 15*a* is axially supported in a state of being fitted in the axially supporting portion 14 through an opening 14*a* open toward the rear upper side of the axially supporting portion 14 in a tubular shape.

As illustrated in FIG. 4, the inclined portion 15*c* is inclined in a front-low rear-high shape similarly to the base portion 15*a*, while the inclined portion 15*c* is inclined in the front-low rear-high shape in a steeper posture (rising posture) than the base portion 15*a* and, as illustrated in FIG. 3, extends so as to be inclined to the vehicle left side (the center console 85 side in the vehicle width direction) as it goes upward with respect to the base portion 15*a*.

Figure 7:
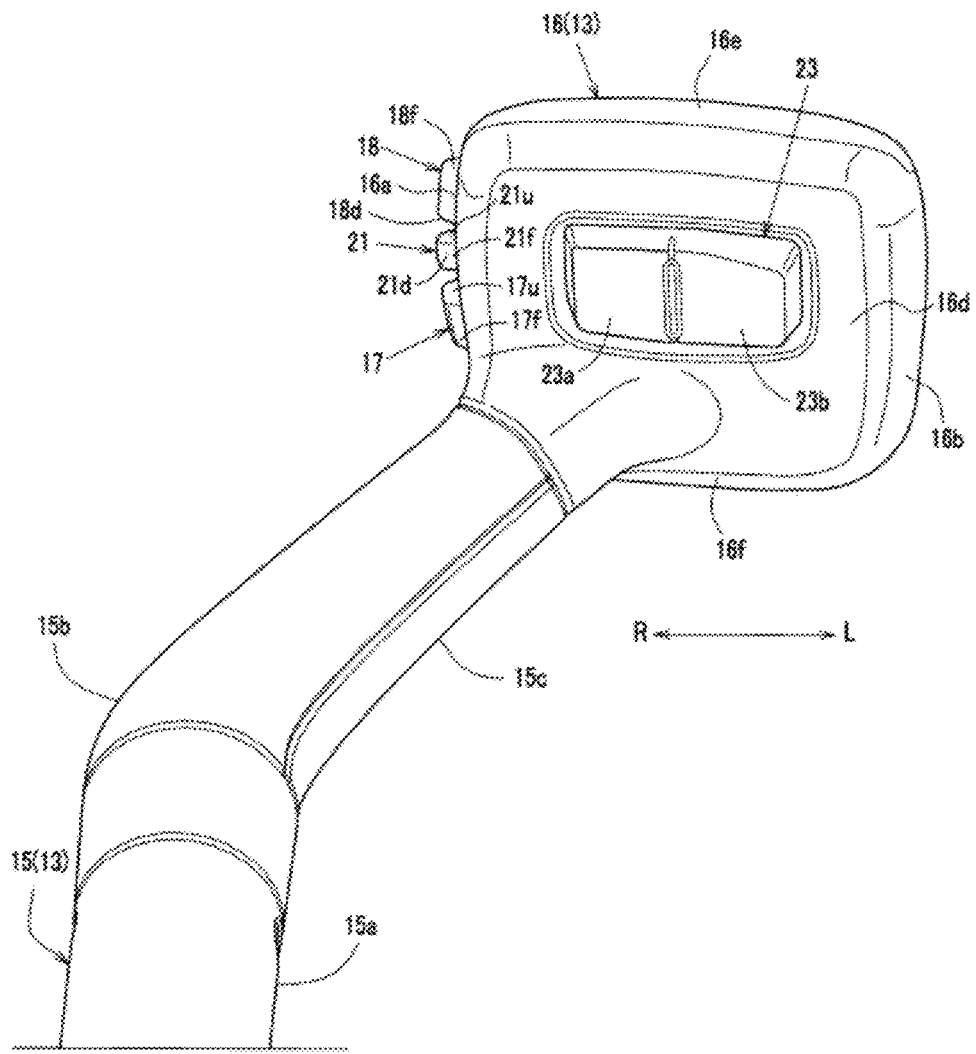
FIG. 7 is a bottom view of the upper portion of the operation bar as viewed from the non-driver side.

Thus, as illustrated in FIG. 7, an upper end of the inclined portion 15*c* is joined to a position near the right side of the vehicle in a lower portion of the grip portion 16, and the inclined portion 15*c* supports the grip portion 16 from therebelow. Note that the inclined portion 15*c* has a lower end formed with the substantially same diameter as the base portion 15*a*, and is formed in a tapered shape as it goes upward.

Figure 5:
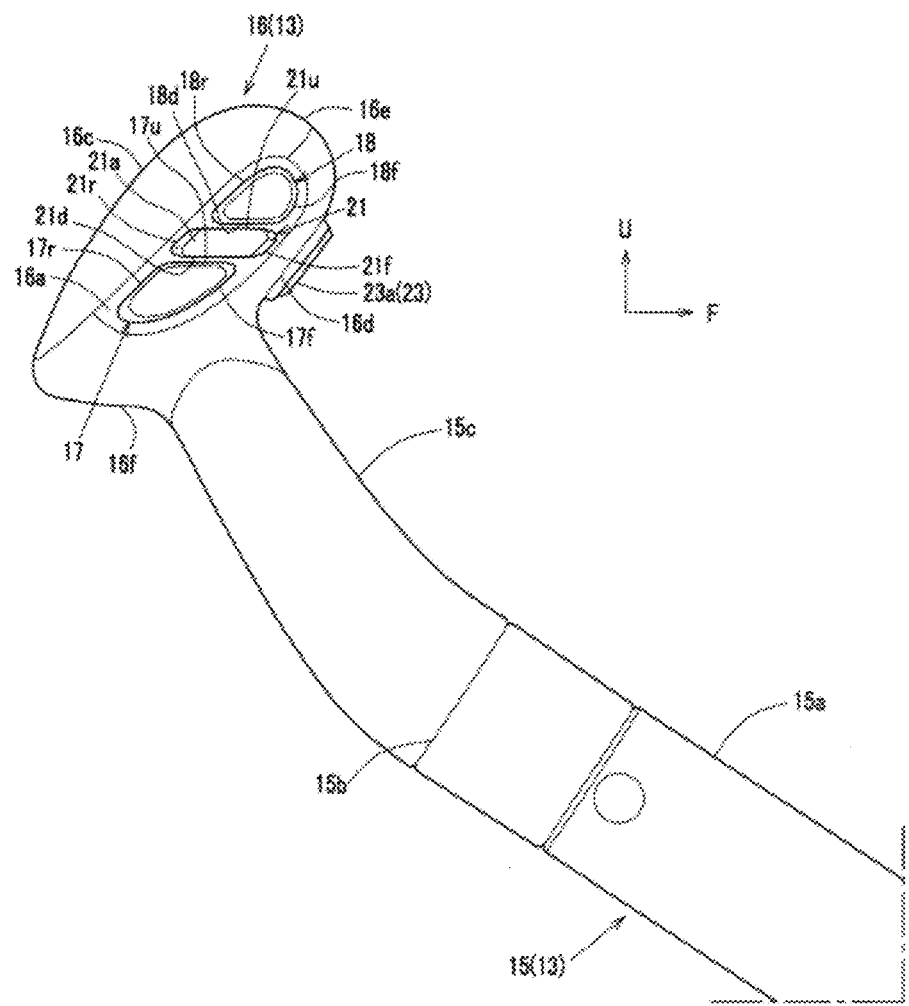
FIG. 5 is a left side view illustrating an upper portion of an operation bar.

As illustrated in FIGS. 4 and 5, the grip portion 16 is provided so as to be inclined diagonally upward toward the vehicle front side from the upper end of the operation bar body 15 (inclined portion 15*c*), is formed in a size in which the driver can grip the grip portion 16 with the left hand, and has a rounded shape as a whole such that the driver can easily grip the grip portion 16. That is, the grip portion 16 is disposed in a posture inclined in a front-high rear-low shape.

Figure 6:
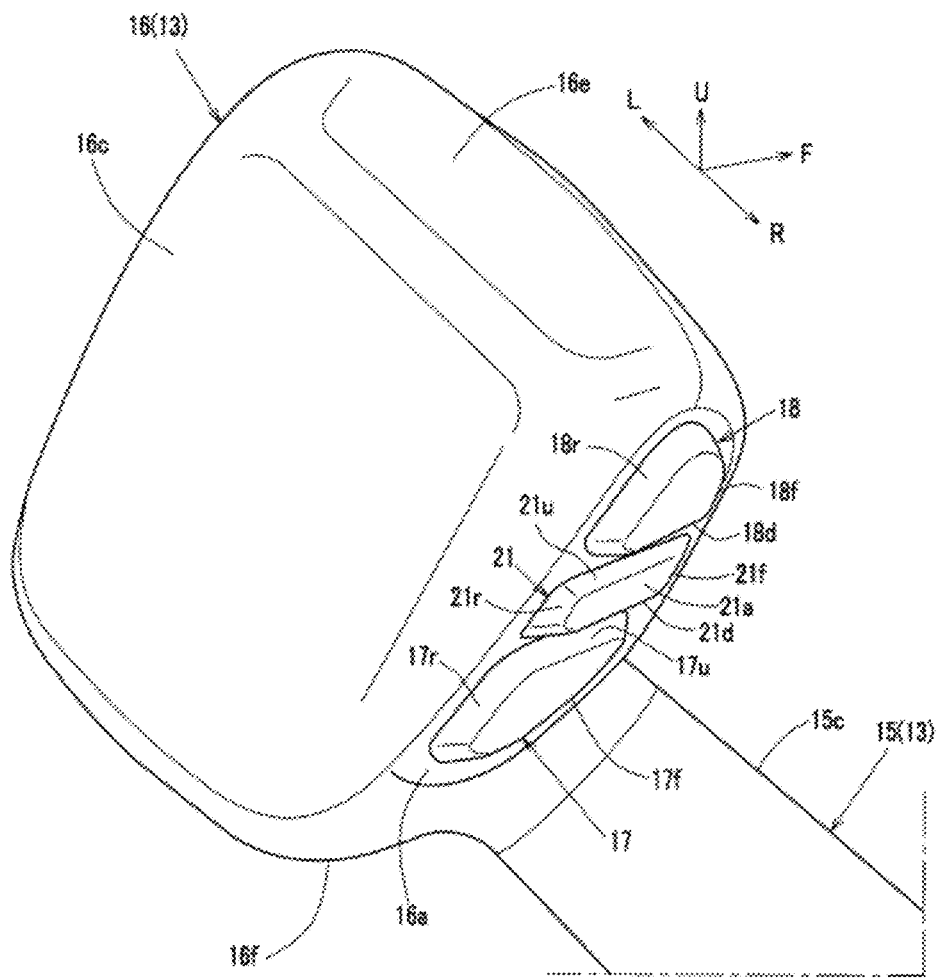
FIG. 6 is a perspective view of the upper portion of the operation bar as viewed from the rear side and the diagonally upper right side.

As illustrated in FIGS. 5 to 7, the grip portion 16 is formed in a substantially rectangular shape having a left-side face 16*a*, a right-side face 16*b* (see FIG. 7), a rear upper face 16*c* (also referred to as a front face) (see FIGS. 5 and 6), a front lower face 16*d* (also referred to as a back face) (see FIG. 7), a front upper face 16*e*, and a lower face 16*f*. The left-side face 16*a*, the right-side face 16*b*, the rear upper face 16*c*, the front lower face 16*d*, the front upper face 16*e*, and the lower face 16*f* are formed so as to face the right direction, the left direction, the rear-upper direction, the front-lower direction, the front-upper direction, and the lower direction, respectively.

A front upper portion of the grip portion 16 is mainly gripped by the left hand of the driver during normal driving. For example, when the grip portion 16 is gripped by the left hand of the driver, a palm of the left hand is disposed so as to cover a front upper portion of the rear upper face 16c of the grip portion 16, and in that state, a fingertip of a thumb of the left hand is disposed at a right upper portion of the left-side face 16a (a section corresponding to a hazard switch 18 described later), an index finger and a middle finger go around the front lower face 16d through the front upper face 16e, and fingertips of the index finger and the middle finger are disposed at a right upper portion of the front lower face 16d (a section corresponding to paddle shift switches 23a and 23b described later).

Thus, the grip portion 16 is formed in a shape in which the front face of the front upper portion is particularly smoothly curved such that the grip portion 16 can be easily gripped by the left hand of the driver. For example, the front upper portion of the grip portion 16 extends so as to be smoothly continuous from the rear upper face 16c to the front lower face 16d via the front upper face 16e and is formed in a curved shape (arc shape) smoothly projecting in the front-upper direction in a vehicle side view (see FIG. 5).

A plurality of operation switches for the driver to perform various operations while gripping the grip portion 16 are disposed on the grip portion 16.

Specifically, as illustrated in FIGS. 5 to 7, a brake lock switch 17 and the hazard switch 18 are disposed on the left-side face 16a of the grip portion 16.

The brake lock switch 17 can lock and hold a brake state when the brake is in an activated state. That is, the brake lock switch 17 is pressed in a state in which the operation bar 13 for the brake operation is pushed down, and thereby can hold the operation bar 13 in the pushed down state. The brake lock switch 17 is pressed again and thereby can release the brake state.

In the present embodiment, as illustrated in FIGS. 5 and 6, the brake lock switch 17 is provided at a position near a lower end in the left-side face 16a, specifically, a position near the rear lower side with respect to a center position in the up-down direction of the left-side face 16a extending in a front-high rear-low shape.

That is, in a state in which the driver grips mainly the front upper portion of the grip portion 16 with the left hand during normal driving (hereinafter referred to as a "normal gripping state"), the brake lock switch 17 is provided at a position not covered with (not touched by) at least the fingertip of the thumb of the left hand.

Specifically, the brake lock switch 17 is provided on the lower side from a section in which the fingertip of the thumb is disposed, and at a position corresponding to immediately under a section in which a base of the thumb is disposed, in the left-side face 16a, in the normal gripping state. The brake lock switch 17 is provided within a movable range in which the fingertip of the thumb can move rearward and downward using the base of the thumb as a pivot from a position of the thumb when the driver grips the grip portion 16 in the normal gripping state.

On the other hand, as illustrated in FIGS. 5 and 6, the hazard switch 18 is provided at a position near an upper end from the position of the brake lock switch 17 in the left-side face 16a of the grip portion 16, specifically, a position near the front upper side with respect to the center position in the up-down direction of the left-side face 16a extending in the front-high rear-low shape.

That is, the hazard switch 18 is provided at a position at which the fingertip of the thumb when the driver grips the grip portion 16 in the normal gripping state is disposed, in the left-side face 16a of the grip portion 16. Thus, the driver can press the hazard switch 18 more quickly than the brake lock switch 17 without little movement of the thumb from the normal gripping state.

In the present embodiment, similarly to a hazard switch (illustration omitted) provided in front of the driver seat 8 in the instrument panel 80, the hazard switch 18 can blink a hazard lamp (emergency blinking lamp) by being pressed by the driver and thereby can alert people around the vehicle and notify them of danger.

Note that the hazard switch 18 is configured to stop the blinking of the hazard lamp by being pressed again.

Furthermore, as illustrated in FIGS. 5 to 7, the hazard switch 18 and the brake lock switch 17 are disposed at positions spaced apart from each other on the respective upper and lower sides, and a projection 21 projecting outward (rightward) from the left-side face 16a is provided between the hazard switch 18 and the brake lock switch 17 in the left-side face 16a of the grip portion 16.

The projection 21 is provided next to the brake lock switch 17 at a position in the vicinity of the front upper side of the brake lock switch 17 in the left-side face 16a, and is provided next to the hazard switch 18 at a position in the vicinity of the rear lower side of the hazard switch 18 in the left-side face 16a.

Similarly to the hazard switch 18 and the brake lock switch 17, the projection 21 projects such that the substantially whole thereof juts out outward (rightward), and has an end face 21a (see FIG. 6) in the projecting direction which is formed in a substantially horizontal plane shape (flat shape) in the up-down direction and the front-rear direction.

Outward projecting heights of the hazard switch 18 and the brake lock switch 17 are the substantially same, while the projection 21 is provided such that an outward projecting height thereof is equal to or more than those of the hazard switch 18 and the brake lock switch 17. In the present embodiment, the projection 21 is provided such that the outward projecting height thereof is slightly higher than those of the hazard switch 18 and the brake lock switch 17 (see FIG. 7).

As illustrated in FIG. 5, the hazard switch 18, the projection 21, and the brake lock switch 17 are disposed in an aspect of being arranged in a row so as to be inclined in a front-high rear-low shape, in the left-side face 16a. That is, the longitudinal direction of the left-side face 16a extends so as to be inclined in a front-high rear-low shape, and the hazard switch 18, the projection 21, and the brake lock switch 17 are disposed in a row along the longitudinal direction of the left-side face 16a.

A lower side 21d of the projection 21 and an upper side 17u of the brake lock switch 17 both extend horizontally in the front-rear direction and are provided such that the substantially whole lower side 21d and the substantially whole upper side 17u in the front-rear direction face each other in the up-down direction. An upper side 21u of the projection 21 and a lower side 18d of the hazard switch 18 both extend horizontally in the front-rear direction and are provided such that the substantially whole upper side 21u and the substantially whole lower side 18d in the front-rear direction face each other in the up-down direction.

Respective rear upper sides 18r, 21r, and 17r of the hazard switch 18, the projection 21, and the brake lock switch 17 all extend on the same straight line inclined in a front-high rear-low shape, and respective front lower sides 18f, 21f, and 17f of the hazard switch 18, the projection 21, and the brake lock switch 17 all extend on the same straight line inclined in a front-high rear-low shape.

Specifically, as described above, the hazard switch 18 and the projection 21 are spaced apart from each other with a slight gap in the up-down direction, and the projection 21 and the brake lock switch 17 are spaced apart from each other with a slight gap in the up-down direction. Thus, the rear upper sides 18r and 21r extend on the substantially same straight line with a break at a boundary portion between the hazard switch 18 and the projection 21, and the rear upper sides 21r and 17r extend on the substantially same straight line with a break at a boundary portion between the projection 21 and the brake lock switch 17.

Similarly, the respective front lower sides 18f and 21f of the hazard switch 18 and the projection 21 extend on the substantially same straight line with a break at the boundary portion therebetween, and the respective front lower sides 21f and 17f of the projection 21 and the brake lock switch 17 extend on the substantially same straight line with a break at the boundary portion therebetween.

Note that the rear upper side 21r and the front lower side 21f in the projection 21 extend in parallel to each other.

In operating the brake lock switch 17 from a state in which the grip portion 16 is gripped by the left hand of the driver in the normal gripping state, the driver moves the fingertip of the thumb located at the hazard switch 18 in the rear-lower direction to the position of the brake lock switch 17 to press the brake lock switch 17.

Here, as described above, the hazard switch 18, the projection 21, and the brake lock switch 17 are disposed in the aspect of being arranged in a row so as to be inclined in the front-high rear-low shape, in the left-side face 16a; the respective front lower sides 18f, 21f, and 17f extend on the same straight line in the front-high rear-low shape; and the respective rear upper sides 18r, 21r, and 17r are formed in an aspect of extending on the same straight line in the front-high rear-low shape.

That is, the hazard switch 18, the projection 21, and the brake lock switch 17 are disposed along the track of the fingertip of the thumb in the rear-lower direction described above. Thus, the driver can quickly move the fingertip of the thumb from the hazard switch 18 to the brake lock switch 17. Furthermore, at that time, the fingertip of the thumb always passes the projection 21; accordingly, it becomes easier for the driver to distinguish both switches 17 and 18 by touch when the fingertip of the thumb passes the projection 21, and in particular, it is possible to prevent erroneous operations of the brake lock switch 17.

In addition, the hazard switch 18, the projection 21, and the brake lock switch 17 are provided on the left-side face 16a in the above aspect, and thus it is possible to provide an aspect in which nothing is provided as much as possible other than a region along the track of the fingertip of the thumb in the left-side face 16a (that is, an aspect in which nothing is unintentionally formed large). Accordingly, an opportunity is suppressed in which the thumb and the like of the left hand of the driver gripping the grip portion 16 unintentionally touches both switches 17 and 18 and the projection 21, and consequently it is possible to suppress the erroneous operations.

Furthermore, as illustrated in FIG. 7, the paddle shift switches 23a and 23b are provided on the front lower face 16d of the grip portion 16 (the back face on the non-driver side). The paddle shift switches 23a and 23b are seesaw-type switches in which the shift-down switch 23b for shift-down and the shift-up switch 23a for shift-up are disposed side by side in a pair.

The paddle shift switches 23a and 23b are disposed at, in a front upper portion of the front lower face 16d of the grip portion 16, that is, a section near the front upper face 16e, a position at which the driver can operate the paddle shift switches 23a and 23b in a state of gripping the grip portion 16 in the normal gripping state with, for example, the fingertips of the index finger and the middle finger.

Specifically, the driver brings the palm of the left hand into contact with the rear upper face 16c of the grip portion 16 (the front face on the driver side) and, in that state, grips the grip portion 16 such that, for example, the index finger and the middle finger go around the front lower face 16d (the back face on the non-driver side) from the rear upper face 16c of the grip portion 16 through the front upper face 16e. The paddle shift switches 23a and 23b are provided at, in the front lower face 16d of the grip portion 16, a position at which, in thus gripping the grip portion 16 with the left hand, the fingertips of the index finger and the middle finger of the left hand are disposed.

Here, as described above, the paddle shift switches 7a and 7b provided on the steering wheel 6 side are disposed in a positional relationship in which, in a plan view, the shift-up switch 7a is on the right side with respect to a central axis (horn) of the steering wheel 6 and the shift-down switch 7b is on the left side with respect to the central axis of the steering wheel 6 (see FIG. 8).

Similarly to the positional relationship of the paddle shift switches 7a and 7b of the steering wheel 6, the paddle shift switches 23a and 23b provided on the grip portion 16 side are also disposed in a positional relationship in which the shift-up switch 23a is on the right side in a plan view (the left side in a front view of the front lower face 16d) and the shift-down switch 23b is on the left side in a plan view (the right side in a front view of the front lower face 16d).

Thus, the driver can perform a pressing operation of the shift-up switch 23a with, for example, the fingertip of the index finger of the left hand in a state of gripping the grip portion 16 and can perform a pressing operation of the shift-down switch 23b with, for example, the fingertip of the middle finger of the left hand in a state of gripping the grip portion 16.

Note that the paddle shift switches 23a and 23b provided on the front lower face 16d of the grip portion 16 are not limited to being operated with the index finger and the middle finger and may be operated with other fingers, for example, operated with the middle finger and the ring finger or operated with the index finger and the ring finger. For example, when the paddle shift switches 23a and 23b are operated with the middle finger and the ring finger, it is possible to perform the pressing operation of the shift-up switch 23a with, for example, the fingertip of the middle finger of the left hand in a state of gripping the grip portion 16 and perform the pressing operation of the shift-down switch 23b with the fingertip of the ring finger of the left hand in a state of gripping the grip portion 16.

As illustrated in FIGS. 1 to 4, the brake manual operation apparatus 10 (driving assistance apparatus) of the above-described embodiment includes, in the vehicle cabin, the operation bar 13 (brake operation portion) that allows the manual brake operation, and is characterized in that, as illustrated in FIGS. 5 to 7, the operation bar 13 is disposed in the vicinity of the vehicle left side of the steering wheel 6 and includes the operation bar body 15 (brake operation body) and the grip portion 16 provided at the upper end of the operation bar body 15, and as illustrated in FIG. 7, the shift-down switch 23b that allows the manual shift-down operation is provided on the grip portion 16.

According to the configuration, even in the case of driving while performing a steering operation with one hand (right hand) and performing the brake operation with the other hand (left hand), it is possible to perform the shift-down operation without separation of the other hand (left hand) from the grip portion 16.

That is, the driver can also perform the shift-down operation while performing the brake operation with the other hand (left hand) and thus can safely decelerate while applying an engine brake.

Specifically, as illustrated in FIG. 8, in the vehicle of the present embodiment, the accelerator lever 31 and the paddle shift switches 7a and 7b (in particular, the shift-down switch 7b) are provided on the steering wheel 6 side. In such a configuration, if the shift-down switch 23b is not provided on the grip portion 16 side and the driver also performs the shift-down operation using the shift-down switch 7b provided on the steering wheel 6 side, the driver needs to perform three operations of the steering operation, the acceleration operation, and the shift-down operation with the one hand (right hand) while performing the brake operation using the operation bar 13 with the other hand (left hand). In that case, a plurality of operations are required on the right hand side during manual driving, and the operability might deteriorate.

Furthermore, although, in traveling on a downhill such as a mountain road, it is preferable to decelerate while utilizing the engine brake in addition to a normal brake, as described above, if the operations on the right hand side are complicated, the shift-down operation using the shift-down switch 7b provided on the steering wheel 6 side is neglected, and consequently there is a concern that it becomes difficult to perform appropriate traveling utilizing the engine brake.

Furthermore, the shift-down switch 7b provided on the steering wheel 6 side is normally provided on the left side same as the side on which, with respect to the central axis of the steering wheel 6, the operation bar 13 for the brake is provided.

Thus, if the shift-down switch 23b is not provided on the grip portion 16 side in the operation bar 13, for example, when the driver performs the shift-down operation using the shift-down switch 7b provided on the steering wheel 6 side, the driver needs to separate once the other hand (left hand) from the grip portion 16 and perform the shift-down operation with the other hand.

During that time, the driver is restricted from manually performing the brake operation using the operation bar 13 and thus might involve risk.

In contrast, in the present embodiment, the shift-down switch 23b is provided on the grip portion 16, and thus it is possible to perform the shift-down operation without separation of the other hand (left hand) from the grip portion 16 while performing the brake operation with the other hand.

That is, the driver can perform the shift-down operation without separation of the other hand (left hand) from the grip portion 16.

Accordingly, the driver can perform the steering operation and the acceleration operation with the one hand (right hand) and perform the brake operation and the shift-down operation with the other hand (left hand).

That is, the driver can easily manually perform the above-described four operations (the steering operation, the brake operation, the acceleration operation, and the shift-down operation) and consequently can safely decelerate while applying the engine brake.

As illustrated in FIG. 7, as an aspect of the present disclosure, it is characterized in that the shift-down switch 23b is disposed at, in the front lower face 16d of the grip portion 16 (the back face on the non-driver side), a position at which the driver can operate the shift-down switch 7b with the fingertip of the thumb in a state of gripping the grip portion 16 in the normal gripping state.

According to the configuration, while the operation bar 13 that allows the brake operation is pushed down with the grip portion 16 gripped, for example, the index finger and middle finger of the left hand gripping the grip portion 16 go around the front lower face 16d from the rear upper face 16c of the grip portion 16 (the front face on the driver side), so that it is possible to easily operate the shift-down switch 23b with the fingertips.

As illustrated in FIG. 8, as an aspect of the present disclosure, it is characterized in that the steering wheel 6 includes the paddle shift switches 7a and 7b that allow the manual shift operation, the paddle shift switches 7a and 7b are formed by the shift-up switch 7a that allows the shift-up operation and the shift-down switch 7b, the paddle shift switches 7a and 7b are disposed in the positional relationship in which the shift-up switch 7a is on one side (vehicle right side) with respect to the central axis of the steering wheel 6 and the shift-down switch 7b is on the other side (vehicle left side) with respect to the central axis, and as illustrated in FIG. 7, the shift-up switch 23a and the shift-down switch 23b are provided on the grip portion 16 in the positional relationship similar to the positional relationship of the paddle shift switches 7a and 7b of the steering wheel 6.

According to the configuration, for example, even a driver who is familiar with the shift operation using the paddle shift switches 7a and 7b of the steering wheel 6 or a driver who uses in combination the paddle shift switches 7a and 7b on the steering wheel 6 side and the paddle shift switches 23a and 23b on the grip portion 16 side can operate each of the paddle shift switches (7a, 7b) (23a, 23b) without a sense of discomfort, and thus it is possible to suppress the erroneous operations.

The present disclosure is not limited to only the configurations of the above-described embodiment and can be formed in various embodiments.

For example, although the brake lock switch 17 and the hazard switch 18 are provided on the left-side face 16a of the grip portion 16 of the present embodiment, the brake lock switch 17 and the hazard switch 18 may not be provided on the grip portion of the present disclosure, or at least only one of these switches 17 and 18 may be provided on the grip portion of the present disclosure.

Furthermore, although in the present embodiment, the shift-up switch 23a and the shift-down switch 23b are disposed side by side on the front lower face 16d of the grip portion 16, not limited to this configuration, only the shift-down switch 23b may be provided, and the shift-down switch 23b may be provided at an area other than the front lower face 16d of the grip portion 16.

For example, when the brake lock switch 17 and the hazard switch 18 are not provided on the left-side face 16a of the grip portion 16, the paddle shift switches 23a and 23b may be provided on the left-side face 16a, not on the front lower face 16d of the grip portion 16.

Furthermore, as long as at least the shift-down switch 23b is provided on the grip portion of the present disclosure, for example, other switches such as switches for controlling ON/OFF and the like of various in-vehicle devices (an air conditioner, an audio, and the like) may be provided on the grip portion of the present disclosure.

REFERENCE SIGNS LIST 6 steering wheel
7a, 7b paddle shift switch (paddle shift switch on steering wheel side)
7a shift-up switch (shift-up switch on steering wheel side)
7b shift-down switch (shift-down switch on steering wheel side)
10 brake manual operation apparatus (driving assistance apparatus)
13 operation bar (brake operation portion)
15 operation bar body (brake operation body)
16 grip portion
16d front lower face of grip portion (back face on non-driver side)
23a shift-up switch (shift-up switch on grip portion side)
23b shift-down switch (shift-down switch on grip portion side)

The invention claimed is:

1. A driving assistance apparatus, comprising:
a brake operation portion configured to apply a brake to a vehicle, the brake operation portion allowing a manual brake operation by a hand of a driver of the vehicle, wherein
the brake operation portion includes a brake operation body and a grip portion configured to be gripped by the hand of the driver, the grip portion being provided at an upper end of the brake operation body,
a shift-down switch configured to shift-down the vehicle is provided on the grip portion, the shift-down switch allowing a manual shift-down operation by the hand of the driver, and
the driving assistance apparatus further comprises
a brake lock switch configured to lock and hold a brake state of the vehicle, the brake lock switch being provided on the grip portion,
a hazard switch configured to blink a hazard lamp of the vehicle, the hazard switch being provided on the grip portion, and
a projection provided between the brake lock switch and the hazard switch.

2. The driving assistance apparatus according to claim 1, wherein
the shift-down switch is provided on the grip portion, such that the driver can operate the shift-down switch with a fingertip of the driver in a state of gripping the grip portion, in a back face on a non-driver side of the grip portion.

3. The driving assistance apparatus according to claim 1, wherein
a shift-up switch configured to shift-up the vehicle is provided on the grip portion, the shift-up switch allowing a manual shift-up operation by the hand of the driver.

4. The driving assistance apparatus according to claim 3, wherein
the shift-down switch and the shift-up switch are seesaw-type switches in which the shift-down switch and the shift-up switch are disposed side by side in a pair.

5. The driving assistance apparatus according to claim 1, wherein
the brake lock switch is configured to lock and hold the brake state of the vehicle, in a state where the brake operation body is pushed down to apply the brake to the vehicle, such that the brake operation body is held in a state of being pushed down.

6. The driving assistance apparatus according to claim 5, wherein
the brake lock switch is configured to lock and hold the brake state of the vehicle when the brake lock switch is pressed, and release the brake state when the brake lock switch is pressed again.

7. The driving assistance apparatus according to claim 1, wherein
the brake lock switch and the projection are provided on the grip portion such that the projection is projecting further from the grip portion than the brake lock switch.

8. A vehicle, comprising:
a brake system configured to apply a brake to the vehicle;
a steering wheel to control steering of the vehicle; and
a brake operation portion configured to control the brake system, the brake operation portion allowing a manual brake operation by a hand of a driver of the vehicle, wherein
the brake operation portion includes a brake operation body and a grip portion configured to be gripped by the hand of the driver, the grip portion being provided at an upper end of the brake operation body,
a shift-down switch configured to shift-down the vehicle is provided on the grip portion, the shift-down switch allowing a manual shift-down operation by the hand of the driver, and
the vehicle further comprises
a brake lock switch configured to lock and hold a brake state of the vehicle, the brake lock switch being provided on the grip portion,
a hazard switch configured to blink a hazard lamp of the vehicle, the hazard switch being provided on the grip portion, and
a projection provided between the brake lock switch and the hazard switch.

9. The vehicle according to claim 8, wherein
the shift-down switch is provided on the grip portion, such that the driver can operate the shift-down switch with a fingertip of the driver in a state of gripping the grip portion, in a back face on a non-driver side of the grip portion.

10. The vehicle according to claim 8, wherein
a shift-up switch configured to shift-up the vehicle is provided on the grip portion, the shift-up switch allowing a manual shift-up operation by the hand of the driver.

11. The vehicle according to claim 8, wherein
the shift-down switch and the shift-up switch are seesaw-type switches in which the shift-down switch and the shift-up switch are disposed side by side in a pair.

12. The vehicle according to claim 8, wherein
the brake lock switch is configured to lock and hold the brake state of the vehicle, in a state where the brake operation body is pushed down to apply the brake to the vehicle, such that the brake operation body is held in a state of being pushed down.

13. The vehicle according to claim 8, wherein
the brake lock switch and the projection are provided on the grip portion such that the projection is projecting further from the grip portion than the brake lock switch.

14. A vehicle, comprising:
a brake system configured to apply a brake to the vehicle;
a steering wheel to control steering of the vehicle; and
a brake operation portion configured to control the brake system, the brake operation portion allowing a manual brake operation by a hand of a driver of the vehicle, wherein
the brake operation portion includes a brake operation body and a grip portion configured to be gripped by the hand of the driver, the grip portion being provided at an upper end of the brake operation body,
a shift-down switch configured to shift-down the vehicle is provided on the grip portion, the shift-down switch allowing a manual shift-down operation by the hand of the driver,
shift-up switch configured to shift-up the vehicle is provided on the grip portion, the shift-up switch allowing a manual shift-up operation by the hand of the driver,
the steering wheel comprises a paddle shift switch including a second shift-down switch configured to shift-down the vehicle and a second shift-up switch configured to shift-up the vehicle, the second shift-up switch is located on one side with respect to a central axis of the steering wheel and the second shift-down switch is located on the other side with respect to the central axis, the one side being closer to one side of the vehicle in a vehicle width direction, and the other side being closer to the other side of the vehicle in the vehicle width direction, the shift-up switch of the brake operation portion is provided on the grip portion closer to the one side of the vehicle in the vehicle width direction than the shift-down switch of the brake operation portion, and the shift-down switch of the brake operation portion is provided on the grip portion closer to the other side of the vehicle in the vehicle width direction than the shift-up switch of the brake operation portion.

* * * * *